United States Patent [19]

Astle et al.

[11] Patent Number: 4,667,548
[45] Date of Patent: May 26, 1987

[54] END PREPARATION TOOL FOR PIPE FITTINGS

[75] Inventors: Henry Astle, Rancho Cordova; Jerald VanderPol, Eldorado Hills; Randall Schuster, Davis; Terry B. Linton, Orangeville, all of Calif.

[73] Assignee: Tri Tool, Inc., Rancho Cordova, Calif.

[21] Appl. No.: 820,080

[22] Filed: Jan. 21, 1986

[51] Int. Cl.$^4$ ............................ B23B 5/16; B23Q 3/06
[52] U.S. Cl. ..................................... 82/4 C; 82/2 E; 269/152; 269/900; 269/902; 408/107; 409/226; 409/227
[58] Field of Search ............................ 82/4 C, 2 E, 20; 269/152, 900, 902; 408/104, 105, 106, 107; 409/225, 226, 227; 29/27 A, 27 C

[56] References Cited

U.S. PATENT DOCUMENTS

| 1,672,808 | 6/1928 | Hansel | 269/902 |
| 1,954,708 | 4/1934 | Mass | 269/152 |
| 2,492,783 | 12/1949 | Chamberlain | 408/104 |
| 2,948,196 | 8/1960 | Branday | 408/105 |
| 4,286,778 | 9/1981 | Follmeyer | 269/900 |
| 4,364,290 | 12/1982 | Astle | 82/4 C |
| 4,445,678 | 5/1984 | George | 269/900 |

Primary Examiner—Nicholas P. Godici
Assistant Examiner—Jerry Kearns
Attorney, Agent, or Firm—Bacon & Thomas

[57] ABSTRACT

An end preparation tool for pipe fittings includes an end preparation tool having a rotary cutting head with shaping bits carried thereon mounted on a base that also carries a universal clamping fixture for pipe fittings having end openings to be machined in preparation for welding. The clamping fixture includes workpiece engaging clamping pads that permit adjustment of the position of the workpiece relative to a pair of opposed clamping plates that normally secure the pipe fitting in place relative to the cutting head of the end preparation tool. The clamping fixture includes adjustment features that enable the fixture to be moved transversely relative to the cutting head, along the rotary axis of the cutting head and about a vertical axis that permits indexing of the clamping fixture relative to the tool cutting head. The workpiece engaging pads are disposed in an array that extends along a square and diagonal pattern of intersecting lines, and along lines perpendicular to the square lines between their intersections. By locating workpiece engaging pads in such a geometric array, virtually all conventional fittings can be accommodated between the clamping pads comprising the clamping fixture using a minimum number of pad elements. Several embodiments of clamping pads are described.

26 Claims, 13 Drawing Figures

END PREPARATION TOOL FOR PIPE FITTINGS

BACKGROUND OF THE INVENTION

1. Field of the Invention

This invention relates to a portable machine tool for preparing open ends of pipe fittings for welding.

2. Description of Related Art

Pipe end preparation tools used to machine open ends of pipes or pipe fittings for welding are disclosed, for example, in U.S. Pat. Nos. 3,103,140, 3,992,123, 4,126,065 and 4,343,207. As can be observed, typical end preparation tools are designed to be portable for use at or near a welding site and include various arrangements for locating pipe or pipe fitting to be machined relative to a rotary cutting head that carries apropriate shaping tool bits that are fed into engagement with the pipe end to be prepared in a precise manner.

Prior art arrangements of pipe and pipe fitting end preparation tools have been found to be lacking in providing a suitable arrangement for universally clamping a pipe fitting in a manner whereby various end surfaces of the pipe fitting can be precisely machined in preparation for welding. Various mandrel arrangements have been utilized as well as clamping systems to locate the pipe or pipe fitting relative to the cutting head of the end preparation tool, but typical known arrangements require the fitting to be disengaged by the mandrel or clamping means each time a different surface of the fitting is to be machined by the end preparation tool.

It is generally known that high volume production systems utilize various arrangements of jigs and fixtures to locate odd shaped pieces relative to a machine tool, but such systems do not generally include arrangements for universally engaging various sizes and shapes of fittings and securing them in place during machining operations on various surfaces of the workpiece without the need for unclamping and relocating the workpiece each time a different end surface of same is to be machined.

SUMMARY OF THE INVENTION

The present invention is intended to provide a fixture for holding a pipe fitting having end openings lying in different planes in alignment with a cutting head of a machine tool that machines the open ends of the pipe fitting in preparation for a welding operation. The device embodied by the invention provides a universal clamping arrangement for pipe fittings that permits pipe fittings of various sizes to be secured clamped relative to the cutting head of a machine tool in a manner whereby open ends of the fitting lying in different planes can be rapidly and precisely located in a position whereat successive machining of the open ends can proceed by the end preparation tool without the need to unclamp or release the pipe fitting between successive end preparation operations.

In accordance with the present invention, a portable end preparation tool for pipe fittings includes an end preparation tool including a rotary cutting head carrying shaping tool bits thereon rotatable about a rotary axis and adjustable both in a feed direction and at least in one other direction transverse to the rotary axis of the cutting head, preferably vertically.

The cutting head is mounted preferable on a base or housing element to permit same to be readily transported and set up at a desired location whereat the end preparation operations are to take place. On the same base or housing element, there is also provided a clamping fixture for universally retaining and securing various shapes of pipe fittings, particularly fittings having end openings in different planes, whereby such fittings can be secured in position relative to the cutting head of the end preparation tool for a machining operation during which the pipe fitting ends are machined to produce a shape suitable for enabling their weldment to pipes or other fittings.

The clamping fixture is arranged to securely hold a pipe fitting workpiece relative to the cutting head of the end preparation tool in a manner whereby the fitting can be moved relative to the tool cutting head laterally transverse of the cutting head rotary axis; towards and away from the cutting head along or parallel to the rotary axis thereof; and in a rotational sense about a vertical axis extending perpendicular to the rotary axis of the cutting head. In addition, the fixture includes a clamping arrangement that permits adjustment of the position of a pipe fitting workpiece relative to the clamping fixture independently of the aforementioned movements of the fixture relative to the cutting head.

Both the end preparation tool including the cutting head and the clamping fixture are mounted on the same base of housing element to permit ready transportation of the assembly as a unit while providing precise alignment features that ensure high quality end preparation cuts on the open ends of the pipe fitting secured in the fixture.

The universal characteristics of the clamping fixture are obtained by utilizing clamping pads including workpiece engaging surfaces that are supported by opposed clamping plates on opposite sides of a pipe fitting workpiece in a geometric array lying along lines arranged in a square pattern and including diagonal lines connecting the corners of the intersecting square lines. The geometric array of workpiece engaging pads enables location of the pads in various arrangements to securely clamp most conventional pipe fittings without the requirement for numerous adaptors or pads to engage different shapes of pipe fittings during end preparation machining of the open ends of the pipe fittings. By utilizing the described geometric array of clamps, virtually all pipe fittings can be secured in place between a pair of clamping plates that support the workpiece engaging pads. At least one of the clamping pds preferably includes means for varying the effective distance between its respective clamping plate and the pipe fitting workpiece so that adjustments can be made between the fitting and the clamping plates to accommodate dimensional variations of the workpiece along its length.

Thus, the clamping fixture universally secures various sizes and shapes of fittings between a pair of clamping plates, provides ready adjustment of the workpiece position relative to the clamping plates by means of pad adjusters that can vary the relative position of the pipe fitting relative to the clamping plates and thereafter, enables the entire assembly of clamping plates, workpiece engaging pads and workpiece to be laterally moved with respect to the cutting head and rotatably indexed with respect to the cutting head to enable end surfaces in different planes to be machined by the end preparation tool.

DESCRIPTION OF THE PREFERRED EMBODIMENT OF THE INVENTION

Figure 1:
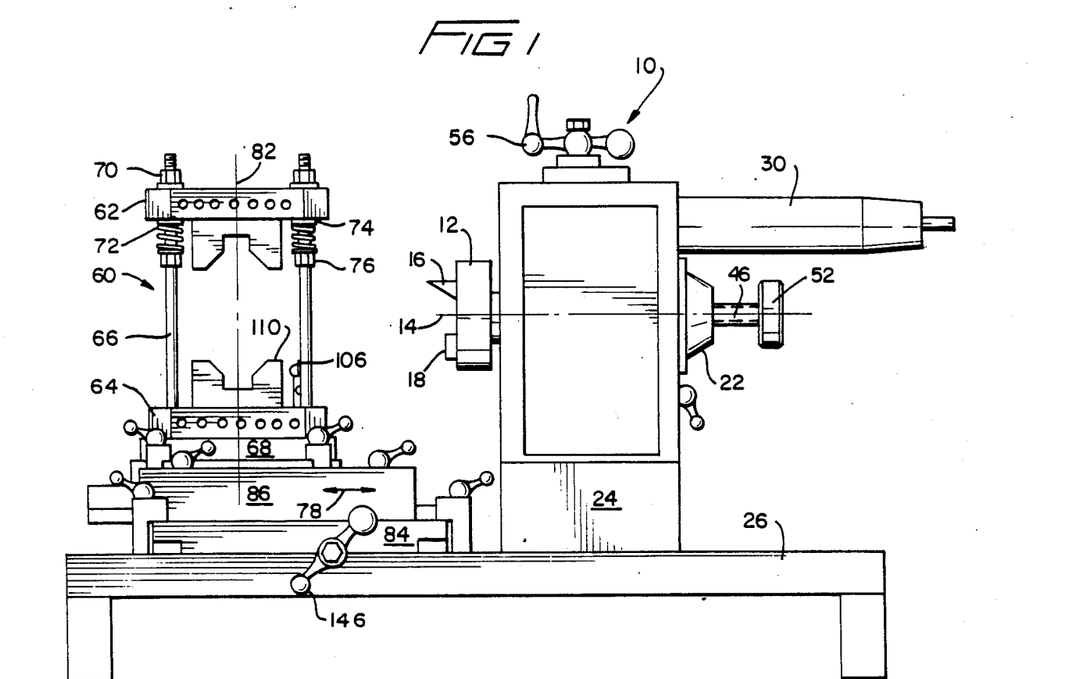
FIG. 1 is a side elevation view of the apparatus embodying the invention.
Figure 2:
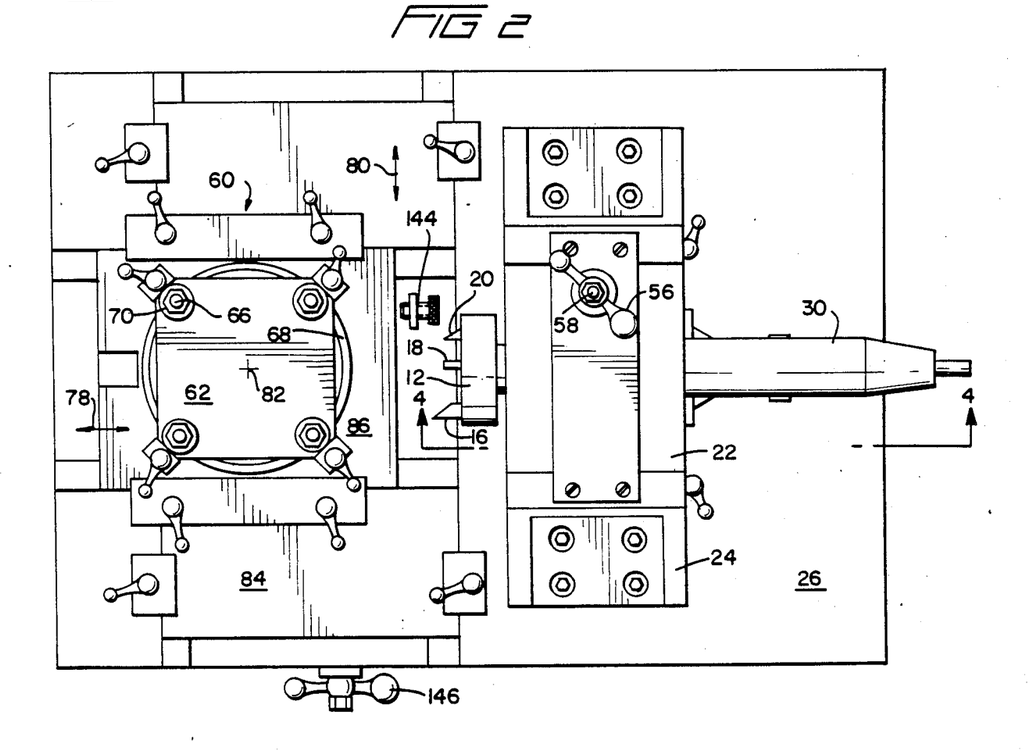
FIG. 2 is a top view of the apparatus shown in FIG. 1.
Figure 3:
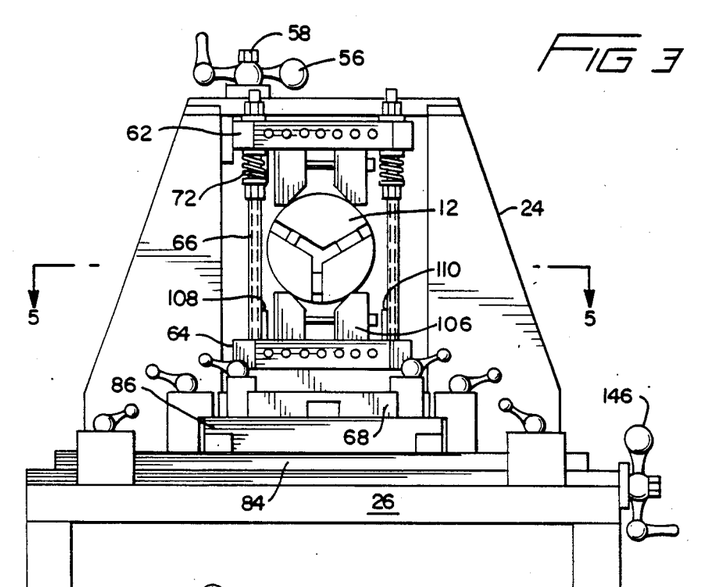
FIG. 3 is an end view of the apparatus shown in FIG. 1.

With reference to the drawings, as illustrated in FIGS. 1-3, and end preparation tool for pipe fittings is generally illustrated at 10 and includes a rotary cutting head 12 mounted for rotation about a cutting axis 14 and carrying cutting tool bits 16, 18 and 20 intended to preform end preparation machining operations on the open ends of pipe fitting workpieces in a manner to be more specifically below.

It is to be understood that the expression "pipe fitting" is intended to denote various shapes and configurations of pipe elements conventionally referred to as "fittings" and which conventionally take the form of elbows, Tees, crosses, reducers, and caps. Such fittings are conventionally formed by casting which produce end products having uniform and rather precise internal diameters but somewhat non-uniform and imprecise external diameters. Thus, systems for clamping such fittings presents special problems when it is desired to accurately locate the end openings of the fittings in coincident relationship with the rotary axis of an end preparation tool. Further problems are presented when it is desired to relocate the fitting for a subsequent machining operation on a different end opening without unclamping and relocating the fitting relative to the clamping fixture.

The cutting head 12 is carried by tool head 22 (see FIG. 2) mounted between upstanding toolhead supports 24 which in turn are mounted on a base member 26.

Figure 4:
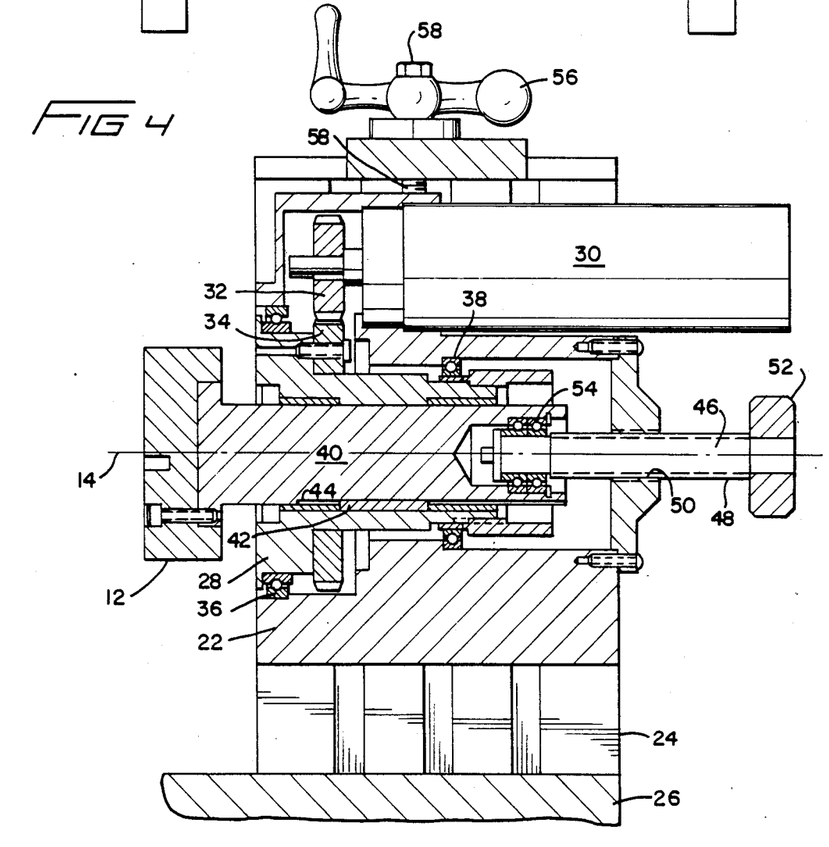
FIG. 4 is a partial sectional view taken along line 4—4 of FIG. 2.

As shown in FIG. 4, the cutting head 12 (shown here without the tool bits) is mounted for rotation within a drive ring 28 that is driven in rotation by, for example, a motor 30 through a pinion and ring gear set 32, 34. The drive ring 28 is mounted for rotation within tool head 22 by appropriate bearings, for example, antifriction bearings 36, 38. Cutting head 12 is attached to the drive ring 28 via spindle 40 that is axially slideable within the drive ring 28, yet locked against rotation relative thereto by key 42 engaging keyway 44 in spindle 40. Longitudinal movement of spindle 40 permits axial feeding of cutting head 12 towards a workpiece and retraction thereof in a direction away from such workpiece along axis 14.

Axial movement of cutting head 12 in a feed direction is controlled by a feed screw 45 including threads 48 engaging cooperating threads 50 in toolhead 22. Rotation of feed scew 46 through, for example, feed knob 52, results in advancement or retraction of feed screw 46 relative to toolhead 22. Since feed screw 46 is connected to spindle 40, for example, by a thrust bearing arrangement 54, axial movement of fed screw 46 is transmitted to cutting head 12. Due to the presence of the key 42 engaging keyway 44 in spindle 40, spindle 40 and cutting head 12 can move axially along the cutting axis 14 while being rotated about such axis 14 by the motor 30 via pinion and ring gear set 32, 34.

Toolhead 22 is mounted between toolhead supports 24 in a manner that permits vertical adjustment of the toolhead 22 relative to the base 26. Preferably, the toolhead 22 engages the toolhead supports 24 through appropriate slide surfaces (not shown) that react all tool loads during machining operations, yet permit the toolhead 22 to vertically slide between the supports 24 when it is desired to vary the vertical position of the toolhead 22 relative to the base 26. Preferable, an elevation control adjustment crank 56 connected to a threaded elevation control shaft 58 cooperates with an appropriate threaded nut or other surface attached to tool head 22 whereby, upon rotation of the crank 56, the vertical position of the toolhead 22 relative to the supports 24 and the base 26 can be adjusted.

Accordingly, it will be observed that the cutting head 12 can be driven about the rotary axis 14 by the motor 30 and moved in a feed direction along axis 14 via feef knob 52 to change the location of the cutting plane of the tool. In addition, the vertical position of axis 14 relative to the base 26 and the tool head supports 24 can be adjusted via crank 56. While tool supports 24 are illustrated as being fixed to the base 26 they could alternatively be mounted to base 26 for movement relative thereto is desired. Moreover, the elevation control means 56, 58 could comprise any suitable arrangement for adjusting the vertical position of the toolhead 22 relative to the base 26. Moreover, in accordance with the preferred embodiment, drive motor 30 is mounted so that it is moveable vertically with toolhead 22.

The cutting tool bits 16, 18 and 20 are conventional tool bits for preforming end preparation machining operations (i.e., turning) on pipes and pipe fittings. Such end preparation may comprise counter boring, end squaring and end beveling in accordance with known procedures. Preparation of the ends of pipes and pipe fittings is generally carried out to prepare same for welding to each other or to other pipes and fittings. Since such welds are often carried out using automatic welding equipment, it is essential that the pipe ends be precisely prepared in a uniform manner from pipe to pipe and from fitting to fitting, generally in accordance with prescribed specifications.

The present invention solves a long-standing problem of preparing the open ends of pipe fittings for welding by machining same using a portable lathe apparatus which is conventionally referred to as an "end prep tool." While the preparation of pipe fittings within the manufacturing facility for the fittings is conventionally carried out in a high volume production process using appropriate jigs and fixtures to cooperate with a machine tool cutting head, it is not previously been known how to precisely locate various fitting shapes relative to the tool cutting head of an end prep tool in a portable system that will produce a uniform, high quality end preparation operation. Usually, complicated or unique jigs and fixtures are required for each shape of pipe fitting encountered and it is not convenient to change the holding fixture from fitting to fitting when the fittings are different shapes and contours. Usually, as mentioned previously, pipe fittings do not have uniform external dimensions, since it is the internal diameter (ID) of the fitting that is generally critical in the production process. Therefore, means must be provided on any fixture holding a pipe fitting during a machining operation to permit adjustments that can readily be made to accommodate the varying external dimensions of the fitting. Clearly, it is essential during an end preparation operation to accurately align the centerline of the pipe fitting opening relative to the rotary axis of the cutting head of the end prep tool so that a precise cut can be made relative to the centerline of the opening in the fitting in preparation for a welding operation to join the fitting to a pipe. A fixture adapted to securely hold the fitting during a such machining operation must be capable of accommodating various dimensional eccentricities inherent in the casting process or other manufacturing process used to produce pipe fittings. It is also essential that the holding fixture for the pipe fitting be capable of quickly rotating the fitting to present different end openings lying in different planes to the cutting head of the end prep tool. It is also essential that the holding fixture be capable of accurately locating the fitting as a whole relative to the cutting head of the end prep tool so that precise machining of the fitting ends can be carried out. The present invention, accordingly, provides an accurate holding fixture 60 (see FIG. 1) for pipe fittings having openings lying in different planes, the fixture furthermore including means for moving a pipe fitting workpiece relative to the base 26 and the cutting head 12 along two different horizontal axes extending substantially parallel to the rotary axis 14 and, in the preferred embodiment, to the base 26, as well as about a vertical axis extending substantially perpendicular to the axis 14 and base 26.

More specifically, the fixture 60 includes upper and lower clamping plates 62, 64 that are normally spaced apart in parallel relationship with the upper plates supported on support rods 66, four of which are provided in this preferred embodiment. The lower plate 64 is mounted on an indexing base 68 which also supports the support rods 66 in parallel vertical relationship. The ends of the rods 66 are threaded to receive clamping nuts 70 located above the upper clamping plate 62, through which rods 66 freely extend. Springs 72 and washers 74 support the upper clamping plate 62 on the rods 66 at a location depending upon the starting position established by the clamping nuts 70 and lower locating nuts 76. It will thus be apparent that, upon rotation of nuts 70, upper clamping plate 62 will be driven towards lower clamping plate 64 until a limit position is reached either as established by a workpiece between the clamping plates or by the lower locating nuts 76.

The clamping plates 62, 64, as well as support rods 6 are movable as a unit relative to axis 14 and base 26 in directions indicated by arrows 78, 80 as shown in FIG. 2. In addition, the clamping plates and support rods are also rotatable as a unit about a vertical indexing axis 82 which extends substantially perpendicular to axis 14 and base 26. To provide such freedom of movement of the clamping plates, a first sliding table 84 is mounted on base 26 for movement in the direction of arrow 80, such direction extending substantially parallel to the base 26 in a lateral direction with respect to the rotary axis 14 of cutting head 12. A second sliding cable 86 is mounted on the first sliding table 84 in a manner permitting motion thereof in the direction of arrow 78, which direction extends substantially parallel to the rotary axis 14 of the cutting head 12. Rotary indexing movement of clamping plates 62 about vertical axis 82 is provided by mounting the indexing base 68 for rotary motion relative to the second sliding table 86 on which the indexing base is mounted. Suitable locks ae provided to releasably sever the tables and indexing base relative to the base 26 and each other. Thus, the clamping plate 62 and the support rods 66 can be located virtually anywhere on the base 26 relative to the cutting head 12 and any end surface of a fitting held between the clamping plates 62, 64 can be presented to the cutting head 12 for an end prep machining operation. Since both the cutting head 12 and the clamping fixture 60 are rigidly located on the same base 26 and since the cutting head and fixture can be precisely aligned relative to each other, precise end prep machining operations can be carried out on fittings held in the fixture 60.

The present invention has as an objective the capability to retain virtually any fitting shape within the fixture 60 in rigid precise relationship relative to cutting head 12 using a minimum number of parts.

An important feature of the present invention is the arrangement whereby pipe fittings can be mounted and accurately located between the clamping plates 62, 64. As mentioned previously, pipe fittings generally do not have uniform external dimensions, since they are conventionally made from metal castings. Moreover, pipe fittings can have may different shapes, including elbow, tee, angles, and crosses. Different end openings of the fittings may be of different internal and external size relative to the other end openings of the fitting, all of which present problems when it comes to accurately mounting and securing various pipe fittings within a single fixture.

The present invention contemplates a universal fixture that is capable of clamping virtually any size or shape fitting within a design range using a minimum number of parts. The invention, furthermore, contemplates a fixture arrangement that enables a fitting to be clamped and secured in place between the clamping plates and thereafter, to be quickly moved into machining position relative to the cutting head 12. Another important feature of the invention is that, once the pipe fitting has been clamped between the clamping plates, any end surface can be presented to the cutting head 12 without releasing or unclamping the fitting from the fixture. Any adjustments that may be required to align a fitting workpiece with the cutting head 12 can be carried out by adjusting the position of the cutting head 12 or the position of the clamping plates 62, 64 relative to the cutting head. Another important characteristic of the invention is that bevel cuts can be made on a fitting if desired; that is, the axis of the fitting end opening can be located at any angle relative to the rotary cutting axis 14 of the cutting head 12.

To provide a universal clamping arrangement for most commonly used pipe fittings, clamping plates 62, 64 are provided each with an array of slots in their opposed facing surfaces extending along lines that are perpendicular to each other in a square pattern and additional slots 102, 104 that extend diagonally between the corners of the intersecting lines 94–100. It will be noted that the diagonal lines 102, 104 lie at 45° angles relative to the adjoining square pattern of intersecting lines 94-100. The array of slots 94-102 is arranged to receive, for example, 3 workpiece engaging pads 106-110 which include mutually facing workpiece engaging surfaces 112-116 which are adapted to engage typical outer cylindrical surfaces of pipe fittings that are provided with end openings to be prepared for welding.

Figure 8:
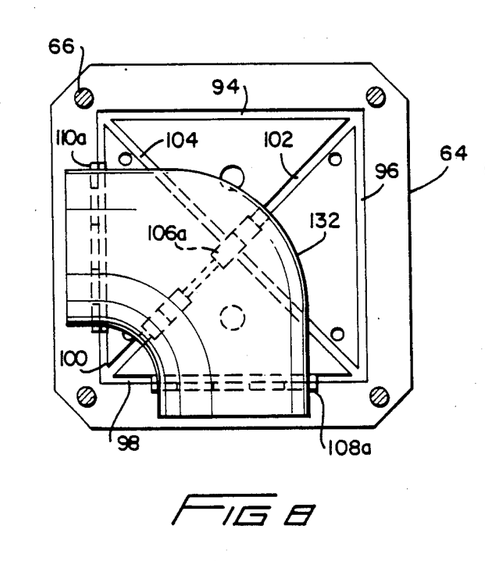
FIGS. 8 and 9 are similar to FIG. 5, and illustrate the invention used with different forms of pipe fittings.

Generally, a minimum of 3 pad sets is preferable for holding a large number of different shapes and sizes of pipe fittings between the clamping plates 62, 64. The arrangement of the 3 pad sets is illustrated in FIGS. 5 and 8.

The pads 106-110 can be located anywhere within the array of slots 94-104 to located and clamp virtually any conventional shape pipe fitting between the clamping plates 62, 64. As shown in FIG. 5, for example, a tee fitting is supported between the lower set of pads 106, 108 and 110 and their opposite counterparts on the upper clamping plate 62.

In accordance with a preferred embodiment of the invention, at least one of the pads 106-110 will include means for adjusting the effective distance between the external surface of a pipe fitting held between the clamping plates and the respective clamping plate. In accordance with the preferred embodiment of the invention illustrated in FIGS. 5-7, pad 110 comprises a split V workpiece engaging surface 116 as best shown in FIG. 6. Pad 110 includes two halves 118, 120 connected together by means of an adjusting screw rod 122 that is threaded received in half 120 and freely mounted within an aperture in pad half 118. Rotation of screw rod 122 varies the distance between the pad halves 118, 120 which in turn, effectively varies the distance between the respective clamping plate on which the pad is mounted and the cylindrical surface of the workpiece in engagement with the surfaces 116. It will be apparent that, as the distance between the open V legs is varied, the resting point of the outer cylindrical surface of a fitting workpiece held between the clamping plates is varied with respect to the clamping plates themselves.

Figure 5:
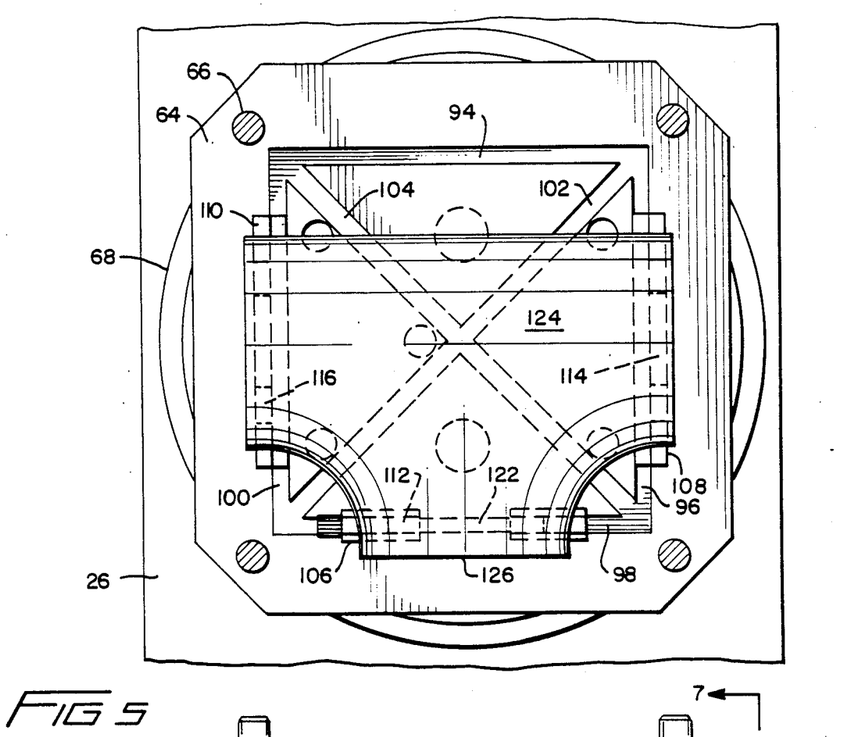
FIG. 5 is a view taken along line 5—5 of FIG. 3.
Figure 6:
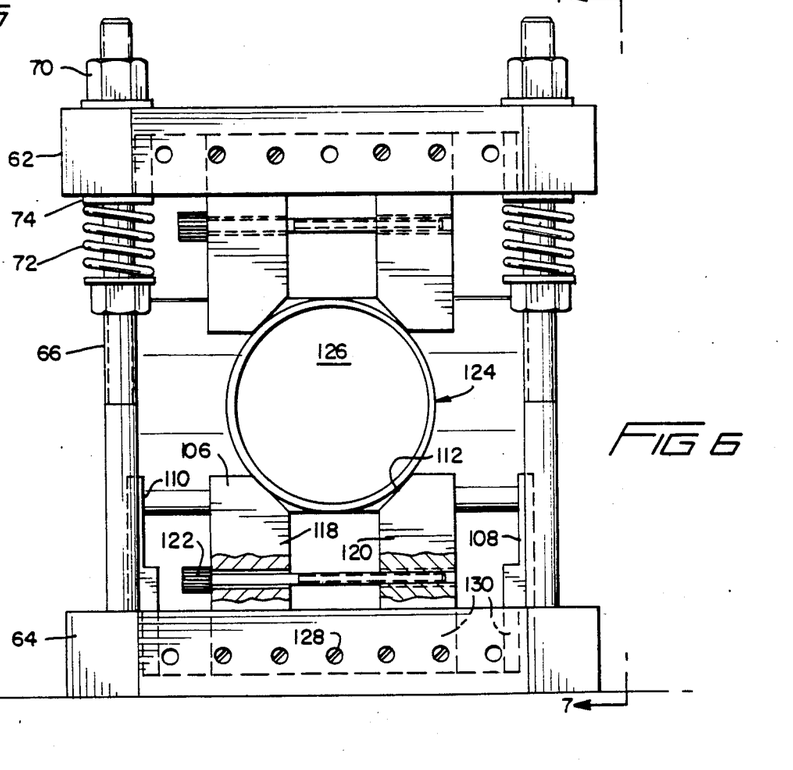
FIG. 6 is a view taken along line 6—6 of FIG. 5.
Figure 7:
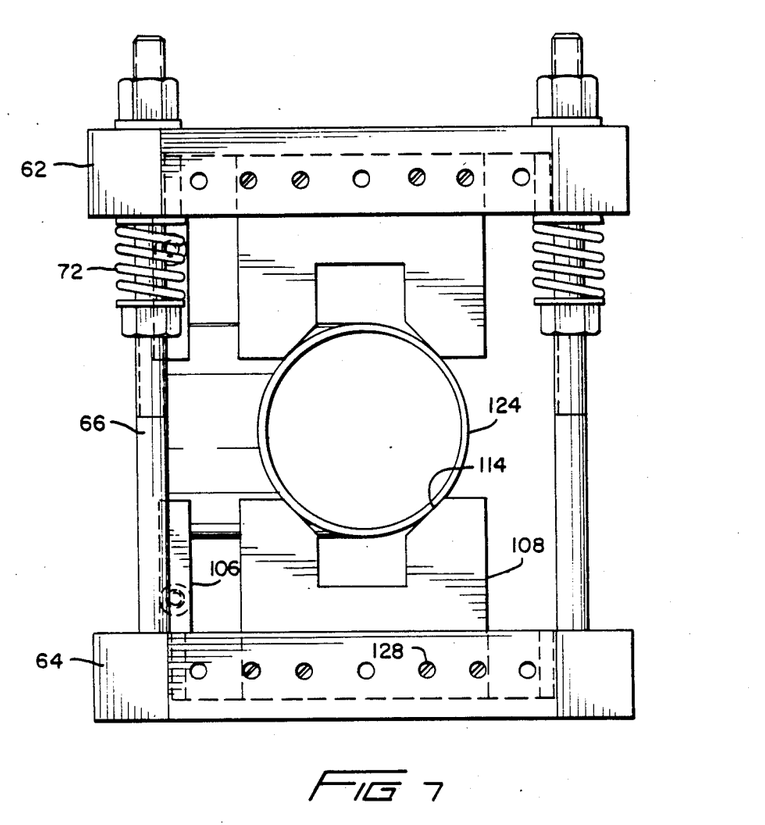
FIG. 7 is a view taken along line 7—7 of FIG. 6.

In the embodiment of FIGS. 5-7, a typical tee fitting 124 is secured between workpiece engaging pads 106-110 mounted on opposed inner surfaces of upper and lower clamping plates 62, 64. Adjustment of the position of the tee fitting workpiece 124 between the clamping plates 62, 64 can be made by adjusting the split pad 110 so that one or more of the end openings 126 of the workpiece 124 is or are accurately located relative to the upper and lower clamping plates 62, 64, as well as the cutting head 12 of the end prep tool.

It will be apparent that more than one adjustable pad 112 can be utilized to accommodate various pipe fittings to be secured in the fixture 60 between the clamping plates 62, 64. For example, 1, two or 3 of the pads 106 ∝ 110 could be adjustable like the pad 110 to provide any degree of adjustment of the fitting workpiece 124 that may be desired between the clamping plates 62, 64. In accordance with the preferred embodiment of the invention, at least one of the workpiece engaging pads 106-110 will be adjustable to vary the effective position (e.g., height) of the workpiece 124 relative to the clamping plates 62, 64.

As shown in FIGS. 6 and 7, the pads 106-110 are secured in their respective slots 94, 96, 98 and 100 by suitable means, for example, set screws 128 engaging slot engaging portions 130 of the pads 106-110. In accordance with the preferred embodiment of the invention, locking screws 128 are only provided adjacent the square line slots 94, 96, 98, 100. Usually, opposed pads located in diagonal slots 102, 104 can be permitted to freely slide within the slot to assume a stable position relative to a pipe fitting workpiece located between the clamping plates 62, 64. However, any suitable locking means could be provided for work engaging pads located in the diagonal slots 102, 104.

Figure 9:
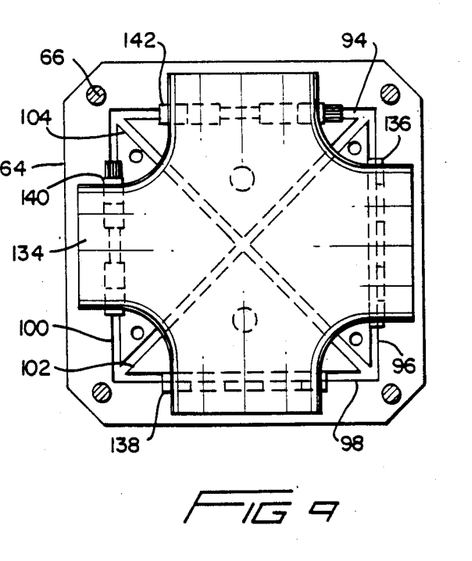

As shown in FIGS. 8 and 9, other pipe fitting pipe configurations can be securely clamped between clamping plates 62-64 by varying the positions of the workpiece engaging pads 106, 108, 110 which are designated as pads 106a, 108a and 100a in FIG. 8 wherein is illustrated an arrangement of the workpiece engaging pads suitable for clamping an elbow shaped pipe fitting 132 between the clamping plates 62, 64.

In FIG. 9, cross shaped pipe fitting workpiece 134 is secured between clamping plates 62, 64 by 4 opposed pairs of workpiece engaging pads 136, 138, 140 and 142. Pad 140 and 142, for example, preferable would be adjustable to vary the height of the workpiece 134 relative to the clamping plates so that the respective open ends of the pipe fitting 134 could be presented to the cutting head 12 of the end prep tool in a precisely established location.

It will be apparent that various other pipe fitting shapes could be accommodated by varying the location of the opposed pairs of workpiece engaging pads within the geometric array of slots 94-102 provided on each clamping plate 62, 64. It should also be apparent that as few as two workpiece engaging pads could be provided within the geometry of slots 94-102 although, in accordance with the preferred embodiment, at least 3 workpiece engaging pads would normally be provided for securing the large majority of pipe fittings. A fourth pad can be provided for clamping shapes such as shown in FIG. 9, for example. Still additional pads could be provided if desired, so long as they could be accommodated within the geometric array of slots 94-104 provided on the clamping plates 62, 64. p It should be understood that additional slots could be provided in the clamping plates 62, 64 to enable the clamping pads to be located at different locations for special applications involving odd shaped pipe fittings. However, as a minimum requirement in accordance with this invention, any geometric arrangement of slots on clamping plates 62, 64 would at least comprise the square and diagonal pattern illustrated in FIG. 8 and described hereinabove.

If desired, an adjustable stop 144 can be provided for accurately locating table 86 relative to the cutting head 12. In addition, an appropriate control 146 including a threaded shaft and crank is provided for controlling the motion of table 84 in the direction of arrows 80.

In operation, considering, for example, a tee shaped pipe fitting workpiece such as shown at 124 in FIG. 5, the clamping plates 62, 64 would be separated sufficiently to enable insertion of the pipe fitting 124 between the opposed set of pad pairs corresponding to pads 106, 108 and 110 illustrated in FIG. 5. The clamping plates would then be brought together by rotating clamping nuts 70 which would drive upper plate 62 towards lower plate 64 until the workpiece engaging pads 106, 108 and 110 were firmly engaged with the outer surface of the pipe fitting workpiece located between the clamping plates. The pads 106, 108 and 110 would be positioned to securely engage the outer diameter of the various legs of the pipe fitting workpiece and a final adjustment of the position of the workpiece relative to the clamping plates 62, 64 could be made by adjusting the opposed pair of split pads corresponding to pad 110 in FIG. 5 so that final position of the workpiece between the clamping plates is established in accordance with a desired set position.

The clamping plates 62, 64 are then positioned by moving the first and second sliding tables 84, 86 and rotating the clamping plates relative to the base 26 so that the desired end of the fitting workpiece is presented to the cutting head 12 in a substantially aligned position whereat the axis of the pipe fitting opening is concentric with the rotary axis 14 of the cutting head 12 or slightly angled relative thereto for a bevel cut. Further adjustments of the relative location of the cutting head 12 and the workpiece 124 can be made by elevating the cutting head 12 relative to the workpiece 124 by maneuvering the elevation control 56 so that the rotary axis 14 is aligned with the axis of the pipe fitting opening to be machined.

If desired, if a mitered cut is desired at the open end of the workpiece fitting, the indexing base 68, can be rotated relative to the base 26 to incline the end of the pipe fitting relative to the cutting plane of the cutting head 12.

When the workpiece is in final position for machining one of the end openings thereof, the cutting head 12, with the appropriate tool bits 16, 18 and/or 20 thereon, is advanced towards the end opening of the pipe fitting work piece by means the feed control knob 52 to carry out the desired machining operation resulting in the preparation of the adjacent open end of the pipe fitting workpiece held in the fixture 60.

Upon completion of the preparation of one end opening of a pipe fitting workpiece held between the clamping plates 62, 64, the clamping plates can be rotated relative to the base 26 about axis 82 to present a different pipe fitting end lying in a different plane from the first pipe fitting end to cutting head 12 for a subsequent end preparation machining operation. Release of the workpiece between the clamping plates 62, 64 is not required, since the various adjustments provided by the sliding tables 84, 86, the indexing base 68 and the vertical adjustment of the cutting head 12 all enable accurate locating of the next pipe fitting opening opposite the cutting head 12 without requiring unclamping of the pipe fitting workpiece.

Figure 10:
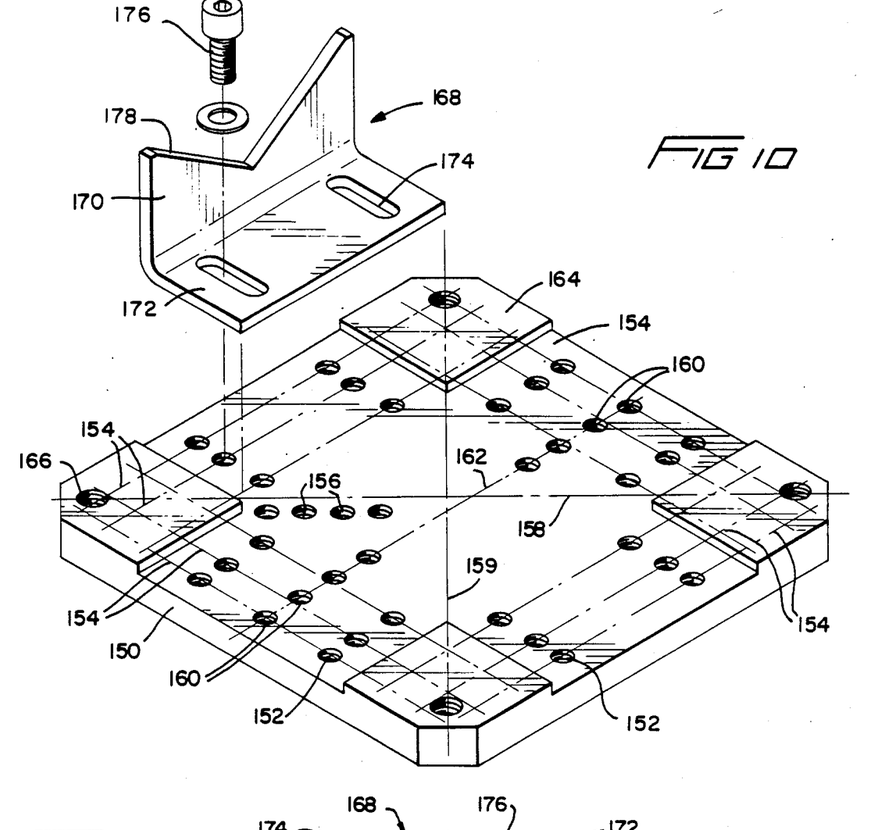
FIG. 10 is a perspective view of an alternate embodiment of a clamping plate arrangement according to the invention.

With reference to FIG. 10, an alternate embodiment of clamping plates 62, 64 is illustrated, as well as an alternate embodiment of the workpiece engaging pads 108, 110. In accordance with the embodiment of FIG. 10, each clamping plate 150, which corresponds to clamping plates 62, 64 in FIG. 1, would be provided with mutiple spaced threaded openings 152 disposed along intersecting perpendicular lines 154 extending parallel and perpendicular to the cutting head rotary axis 14. In addition, additional openings 156 are provided extending along a diagonal line 158 connecting the opposed corners of the intersecting parallel and perpendicular lines 154. Only one set of openings 156 is illustrated along line 158, but it is to be understood that additional openings could be provided along line 158 as well as along opposite diagonal line 159.

In addition, third set of openings 160 may be provided extending along a line 162 that is perpendicular to square pattern lines 154 between the opposed corners of the square pattern of lines 154.

Clamping plate 150 may also be provided with raised portions 164 at the four corners of the plate, the purpose of which will be explained momentarily. Appropriate apertures 166 are provided at the four corners of the clamping plate 150 for receiving clamping bolts 66 (see FIG. 1).

In accordance with this embodiment, workpiece engaging pads used with the clamping plate comprise L-shaped elements 168 including a vertical leg 170 and a horizontal leg 172 disposed, in accordance with this embodiment, at approximately right angles to the vertical leg 170. The horizontal leg 172 is provided with elongated openings 174 for receiving locking bolts 176 that engage the threaded openings 152 in clamping plate 150 that extend along perpendicular square-patterned lines 154.

The vertical leg 170 of the workpiece engaging pad 168 includes a V-shaped workpiece engaging surface area 178 which corresponds to workpiece engaging surfaces 114, 116 in the embodiment according to FIG. 1.

Clamping pad 168 is secured to clamping plate 150 by a pair of bolts 176 extending through openings 174 in leg 172 of the pad 168. The bolts 176 are threadedly received in threaded openings 152 extending along the square pattern array of lines and the pad 168 is prevented from moving longitudinally along the square pattern of lines by means of the raised portions 164 of the pad 150. It is to be understood that the raised portions 164 could be made integral with pad 150, or could comprise various types of motion blocking devices secured to an otherwise flat upper surface of clamping plate 150. When pad 168 is secured to plate 150, the workpiece engaging surface 178 extends parallel to at least one of the lines 154 and is restrained against movement that would place the workpiece engaging surface 178 of of alignment with the lines 154.

The pad 168 is adjustable in a direction extending perpendicular to the lines 154 by reason of the elongated openings 174 that permit pad 168 to be moved for adjustment to accommodate various size workpiece fittings within the range of travel permitted by the elongated openings 174.

Figure 11:
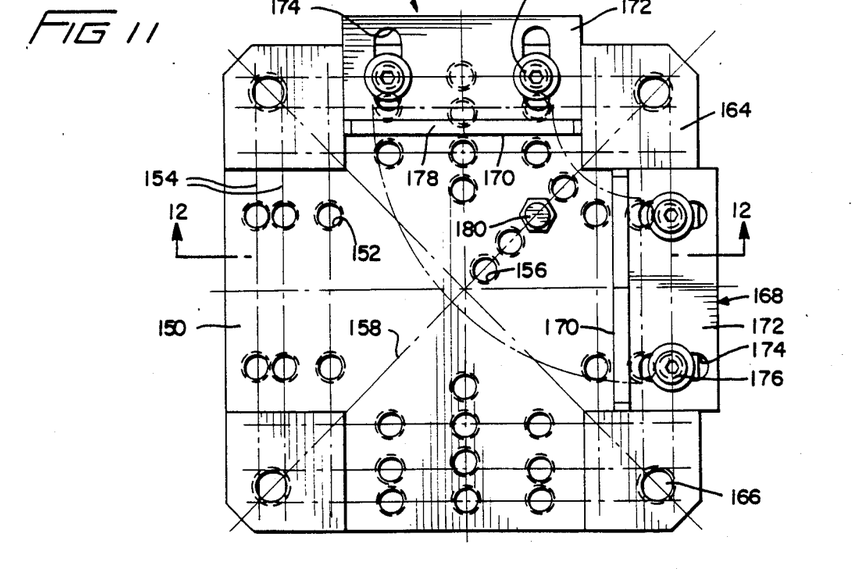
FIG. 11 is a plan view of the clamping plate shown in FIG. 10 using a different arrangement of workpiece engaging pads.

As shown in FIG. 11, normally at least a pair of workpiece engaging pads 168 will be provided on each clamping plate so that the pads face each other so that the workpiece engaging surfaces 178 lie in opposed pairs for receiving a workpiece fitting between them in clamping relationship, in a manner similar to the first embodiment of the invention described above.

In FIG. 11, a pair of workpiece engaging pads 168 are mounted on a clamping plate 150 with the horizontal legs 172 thereof turned outwardly. As seen in FIG. 10 above, the position of the horizontal legs 172 of the pads 168 can be inward or outward with respect to the center of the clamping plate 150. This will permit a fewer number of workpiece engaging pads to accommodate a wider range of fitting sizes.

In FIG. 11, the workpiece is an elbow fitting shown in phantom lines to illustrate its position relative to the clamping plate and workpiece engaging pads.

In addition to the pair of workpiece engaging pads 168, an adjustable height workpiece engaging pad 180 is also provided for adjusting the height of the fitting relative to the clamping plate 150. Normally, a pair of adjustable pads 180 will be provided on the upper and lower clamping plate of the assembly in an opposed pair for adjustably clamping the fitting between them when the clamping plates are in the clamped position relative to a workpiece.

Figure 12:
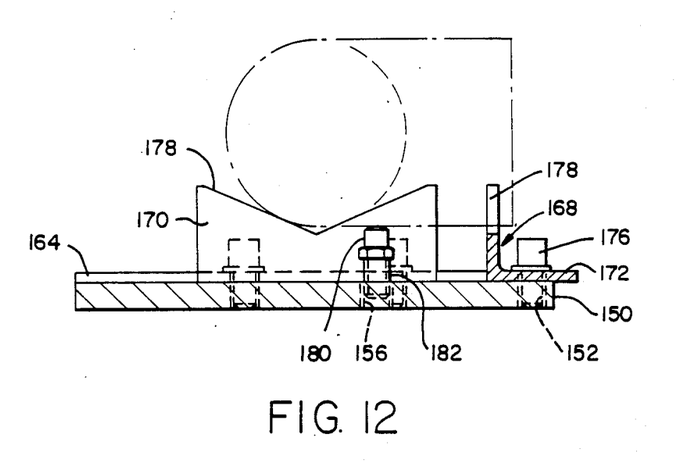
FIG. 12 is a plan view showing another arrangement of workpiece engaging pads using the clamping plate shown in FIG. 10.

Adjustable height pad 180 in accordance with this embodiment comprises a screwjack including a threaded lower portion 182 received in a threaded opening in clamping plate 150, whereby rotation of portion 182 will raise or lower the height of the workpiece engaging surface (the upper end as shown in FIG. 12) of pad 180. The relationship of the elements is shown in FIG. 12.

It will be observed that the workpiece engaging surfaces of the workpiece engaging pads are disposed in a geometric array, the locus of which comprises a geometric pattern extending along intersecting lines 154 that lie laterally perpendicular and parallel to the cutting head rotary axis 14 in a square configuration and at least along one diagonal line 158 connecting one pair of diagonally opposed corners of the square pattern at an angle of 45° with respect to the lateral and parallel lines. In the embodiment according to FIG. 11, the adjustable height pad is disposed along the diagonal 158 while the loci of workpiece engaging surfaces 178 of pads 168 extend along the intersecting square pattern of lines 154.

Figure 13:
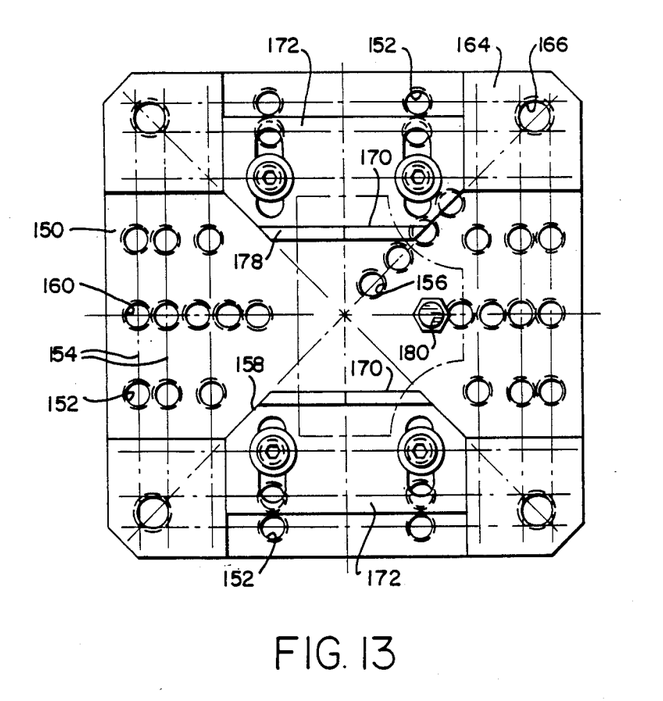
FIG. 13 is a view taken along line 13—13 of FIG. 12.

FIG. 13 is similar to FIG. 11, only illustrates that the workpiece engaging pads 168 can be mitered at their corners whereat the vertical leg extends from the horizontal leg. This enables closer spacing of workpiece engaging pads at right angles to each other for accommodating smaller size workpiece fittings.

In this embodiment, adjustable height pad 180 is disposed in one of the openings 160 extending perpendicular to the square pattern of lines between the line intersections. This provides a clamping system for receiving T-fittings and adjusting them relative to the cutting head of the end preparation tool. The workpiece engaging surfaces 178 of clamping pads 168 are still disposed along intersecting lines forming a square pattern, as is the case with the previously described embodiments.

It will be understood that various modifications to the preferred embodiment could be made by a person skilled in the art without departing from the spirit and scope of this invention, which is defined in the ensuing claims.

What is claimed is:

1. An end preparation tool for pipe fitting workpieces comprising:
    a base;
    a tool carrying cutting head rotatably mounted on the base;
    a drive input means for the cutting head arranged to drive the cutting about a longitudinal rotary axis extending generally parallel to the base;
    feed means for moving the cuttng head along the rotary axis;
    elevation control means for adjusting the vertical position of the cutting head above the base;
    a workpiece holder mounted on the base adjacent the cutting head;
    indexing means for enabling selective adjustment of the workpiece holder position about a vertical axis;
    axial positioning means for enabling selective adjustment of the workpiece holder position in a direction extending parallel to the rotary axis of the cutting head;
    transverse positioning means for enabling selective adjustment of the workpiece folder position in a direction laterally transverse of the cutting head rotary axis and generally parallel to the base;
    said workpiece holder comprising upper and lower clamping plates adjustably spaced apart vertically; means for selectively urging the plates towards each other to engage and fixedly retain a workpiece between the plates in alignment with the rotary axis of the cutting head; upper and lower workpiece engaging pads including workpiece engaging surfaces mounted in opposed pairs on the respective plates, and at least one adjustable height pad mounted on one of the plates including effective height adjustment means for selectively varying the effective height of the contact point of the workpiece engaging surface of said adjustable height pad with a workpiece with respect to the respective plate supporting the pad, all said pads disposed in a geometric array on said plates, the locus of said geometric array comprising a geometric pattern extending along intersecting lines that lie laterally perpendicular and parallel to the cutting head rotary axis in a square configuration and along at least one diagonal line connecting one pair of diagonally opposed corners of the square pattern at an angle of 45° with respect to the lateral and parallel lines.

2. An end preparation tool according to claim 1, wherein said drive input means is a drive motor, said motor being axially and vertically movable with the cutting head.

3. An end preparation tool according to claim 1, said workpiece engaging surfaces of at least one pair of said opposed pairs of pads comprising V surfaces; said effective height adjustment means of said adjustable pad comprising a split V surface, and means for selectively adjusting the gap distance between the legs of the V surface.

4. An end preparation tool according to claim 1, said adjustable pad comprising a variable effective length element.

5. An end preparation tool according to claim 4, said variable effective length element comprising a screwjack.

6. An end preparation tool according to claim 1, said geometric array of lines including two of said diagonal lines connecting opposed pairs of opposed corners of said square pattern.

7. An end preparation tool according to claim 1, said geometric pattern also extending along lines perpendicular to said intersecting perpendicular and parallel lines between intersections of said perpendicular and parallel lines.

8. An end preparation tool according to claim 3, said geometric pattern being defined by open lateral, axial and diagonal continuous slots in opposed surfaces of said clamping plates, said pads including slot engaging portions adapted to fit in said slots.

9. An end preparation tool according to claim 1, including a second adjustable pad mounted on the clamping plate opposite the clamping plate on which the first said adjustable pad is mounted and including effective height adjustment means for selectively varying the effective height of the workpiece contact point of the workpiece engaging surface of said second adjustable pad with respect to its respective supporting plate, said adjustable pad being mounted in opposition to the first said adjustable pad to thereby function as an adjustable clamping pair of pads with respect to a workpiece disposed between them.

10. An end preparation tool according to claim 1, said opposed pairs of pads each comprising generally an L-shaped element including a vertical and horizontal leg, said vertical leg including said workpiece engaging surface, said horizontal leg engaging its respective clamping plate.

11. An end preparation tool according to claim 10, including means on said clamping plates for positively limiting movement of said L-shaped elements in a direction along said intersecting lines of said geometric pattern lying perpendicular and parallel to said cutting head rotary axis.

12. An end preparation tool according to claim 10, including adjustable securing means for adjustably securing said pairs of pads to their respective clamping plates so that the pads can each be adjusted in opposite directions extending normal to said intersecting lines of said geometric pattern that lie perpendicular and parallel to the cutting head rotary axis.

13. An end preparation tool according to claim 10, including means on said clamping plates for limiting movement of said L-shaped elements in a direction along said intersecting lines of said geometric pattern lying perpendicular and parallel to said cutting head rotary axis, and adjustable securing means for adjustably securing said pairs of pads to their respective clamping plates so that the position of the pads can each be adjusted in opposite directions extending normal to said intersecting lines of said geometric pattern that lie perpendicular and parallel to the cutting head rotary axis.

14. A holder for pipe fittings for securing pipe fittings during machining operations on various end surfaces of the fittings comprising:
a pair of spaced clamping plates mounted for movement towards and away from each other;
means for selectively moving the plates at least towards each other and means for securing the plates at a workpiece clamping position;
workpiece engaging pads mounted in opposed pairs on opposed, facing surfaces of the plates, said pad pairs including opposed mutually facing pairs of workpiece engaging surfaces; and at least 1 adjustable workpiece engaging pad including a workpiece engaging surface and effective height adjustment means for varying the effective distance between its respective support plate and the workpiece engaging area of its workpiece engaging surface;
said pads being disposed in a geometric pattern of straight lines including a square pattern of intersecting lines and at least one diagonal line connecting one pair of opposed intersections of the intersecting square lines.

15. A holder for pipe fittings as claimed in claim 14, including:
a support base;
said clamping plates movably mounted on said base for translational movement on the base in perpendicular directions substantially parallel to the base and for rotation about an axis intersecting the plates and extending normal to the base.

16. A holder for pipe fittings as claimed in claim 14, including slots in said clamping plates extending along said intersecting and diagonal lines; said pads including slot engaging portions disposed in said slots.

17. A holder for pipe fittings as claimed in claim 14, said workpiece engaging surfaces comprising V shaped surfaces facing each other at the open end of the V surfaces, said effective height adjustment means of said at least 1 pad pair including split V surfaces and means for varying the open distances between the opposite legs of the V surfaces.

18. A holder for pipe fittings as claimed in claim 14, said adjustable workpiece engaging pad comprising a variable effective length element.

19. A holder for pipe fittings as claimed in claim 18, said variable effective length element comprising a screw-jack.

20. A holder for pipe fittings as claimed in claim 14, said geometric array of lines including two of said diagonal lines connecting opposed pairs of opposed corners of said square pattern.

21. A holder for pipe fittings as claimed in claim 14, including a second adjustable pad mounted on the clamping plate opposite the clamping plate on which the first said adjustable pad is mounted and including effective height adjustment means for selectively varying the effective height of the workpiece contact point of the workpiece engaging surface of said second adjustable pad with respect to its respective supporting plate, said second adjustable pad being mounted in opposition to the first said adjustable pad to thereby function as an adjustable clamping pair of pads with respect to a workpiece disposed between then.

22. A holder for pipe fittings as claimed in claim 14, said geometric pattern also extending along lines lying perpendicular to said intersecting perpendicular and parallel lines between opposed corners of said square pattern.

23. A holder for pipe fittings as claimed in claim 14, said opposed pairs of pads comprising generally L-shaped elements including a vertical and horizontal leg, said vertical leg including said workpiece engaging surface, said horizontal leg engaging its respective clamping plate.

24. A holder for pipe fittings as claimed in claim 23, including means on said clamping plates for limiting movement of said L-shaped elements in a direction along said intersecting lines of said geometric pattern.

25. A holder for pipe fittings as claimed in claim 23, including adjustable securing means for adjustably securing said pairs of pads to their respective clamping plates so that the positions of the pads can each be adjusted in opposite directions extending normal to said intersecting lines of said square pattern.

26. A holder for pipe fittings as claimed in claim 23, including means on said clamping plates for positively limiting movement of said L-shaped elements in a direction along said intersecting lines of said square pattern and adjustable securing means for adjustably securing said pairs of pads to their respective clamping plates so that the pads can each be adjusted in opposite directions extending normal to said intersecting lines of said square pattern.

* * * * *